United States Patent

[11] 3,572,620

| [72] | Inventors | Harry R. Kincaid<br>Rte. 3, Box 157A, Johnstown, Ohio 43031;<br>William D. Wardle, 1887 Oakland Ave.,<br>Columbus, Ohio 43224 |
|---|---|---|
| [21] | Appl. No. | 857,748 |
| [22] | Filed | Sept. 15, 1969 |
| [45] | Patented | Mar. 30, 1971 |

[54] BALANCING SUPPORT UNIT
7 Claims, 4 Drawing Figs.

| [52] | U.S. Cl. | 248/17, 248/370, 73/462 |
|---|---|---|
| [51] | Int. Cl. | F16m 13/00, G01m 1/16 |
| [50] | Field of Search | 248/17, 18, 370; 73/462, 477 |

[56] References Cited
UNITED STATES PATENTS

| 208,531 | 10/1878 | Marqua | 248/370X |
|---|---|---|---|
| 2,028,549 | 1/1936 | Lord | 248/18UX |
| 2,078,445 | 4/1937 | Geyer | 248/18 |

*Primary Examiner*—Roy D. Frazier
*Assistant Examiner*—William H. Schultz
*Attorney*—Harry B. Keck ABSTRACT: improved balancing support unit adapted to be connected to any suitable supporting structure, such as, rails in the floor of a building, a lathe bed, a working table, and the like. The support unit includes a garden swing suspension structure disposed entirely within a stationary housing. A supporting pedestal, supported by the swing structure, has a top presented exteriorly of the housing and adapted to receive a rotor support device.

Patented March 30, 1971
3,572,620
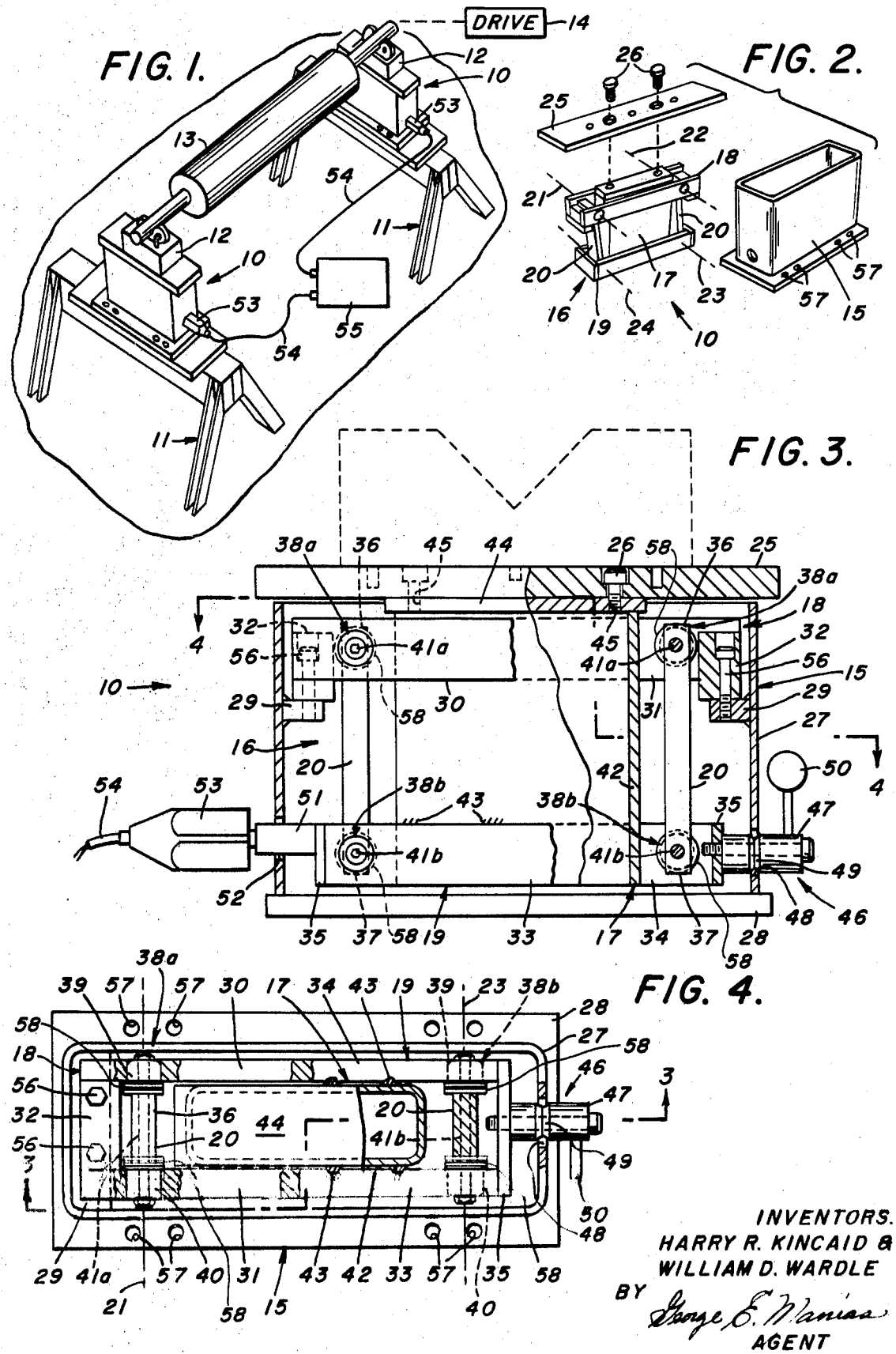

3,572,620

BALANCING SUPPORT UNIT

BACKGROUND OF THE INVENTION

1. Field of the Invention

This invention relates to apparatus for dynamic balancing of rotors, and more particularly to improvements in a balancing support unit of the type which may be quickly mounted on any suitable horizontal support structure.

2. Description of the Prior Art

The dynamic balancing of rotors is a highly developed art. In the two-plane balancing technique, a test rotor is supported in suitable balancing stands and is caused to rotate while supported on movable bearings. The movement of the bearings is consequential to the unbalance of the test rotor. The movements of the bearings is electromechanically converted into sinusoidal electrical impulses which are analyzed by appropriate phase and amplitude measurements to determine, in relation to the two planes of measurement, the geometric location and quantity of unbalance in the test rotor. The available apparatus for analyzing the sinusoidal electrical impulses is lightweight and compact.

The prior art has many examples of simple and complex balancing stands capable of supporting test rotors. Such stands normally are integral components of complex, large and expensive dynamic balancing apparatus. See U.S. Pat. Nos. 1,971,562; 2,349,530; 2,651,937; RE 23,784; RE 23,785. Such balancing stands also are designed for attachment to and use with other complex, large and expensive dynamic balancing apparatus. See U.S. Pat. Nos. 2,551,480; 2,754,686; 3,106,846; 3,336,809. Few machine shops can justify the expense and space requirements of such balancing apparatus.

Another type of balancing support stand disclosed in the prior art, is adapted for use with a conventional metal working lathe, see U.S. Pat. No. 3,090,237. When used in conjunction with the above-mentioned lightweight, compact analytical apparatus, a simple conventional metal working lathe can be quickly converted into a sensitive balancing test stand for dynamic balancing of rotors.

A still further type of balancing support stand disclosed in the prior art, is adapted to be suspended from any suitable support by spaced reeds, see U.S. Pat. No. 3,413,046. The suspension duplicates the basic compound pendulum operation used extensively in the prior art.

SUMMARY OF THE INVENTION

The principal object of this invention is to provide a balancing support unit which can be quickly mounted on any supporting structure, e.g., rails in the floor of a building, a lathe bed, a working table, and the like.

Another object of this invention is to provide a balancing support unit wherein the movable components thereof are protectively enclosed within a housing.

A further object of this invention is to provide a balancing support unit having platform adapted to receive any rotor support device.

The present invention provides a balancing support unit having three basic components—a housing, a swing structure and a pedestal. The housing is adapted to be quickly mounted on any support structure. The swing structure is contained entirely within the housing and includes a base member and suspension means suspending the base member for free swinging movement. The pedestal is secured to the base member and extends upwardly within the swing structure. The pedestal has a top or platform presented externally of the housing and adapted to receive a rotor support device, such as a V-block, rollers and the like.

Further in accordance with the invention, the swing structure comprises a rigid upper mounting member rigidly secured to the housing. The base member is positioned below the mounting member. The suspension means comprises two pendulum arms, each having a lower end pivotally connected to the base member and an upper end pivotally connected to the mounting member. The base member and the pedestal are oscillatable as a unit. The entire swing structure including the pedestal is protectively enclosed with the housing and therefore is less subject to damage than stands of the prior art. A useful lockup feature is provided to stabilize the support unit during rotor installation and removal.

BRIEF DESCRIPTION OF THE DRAWINGS

FIG. 1 is a perspective view of a pair of balancing support units of this invention, supporting a rotor and illustrating a typical supporting structure to which the units are connected;

FIG. 2 is an exploded perspective view of a housing, a swing structure, a pedestal and an adapter plate comprising the major components of the balancing support unit of this invention;

FIG. 3 is a cross-sectional side view, taken substantially along the line 3–3 of FIG. 4; and FIG. 4 is a cross-sectional plan view taken along the line 4–4 of FIG. 3.

DESCRIPTION OF THE PREFERRED EMBODIMENT

FIG. 1 illustrates a pair of balancing support units 10 of this invention. Each unit 10 is connected to and supported by a conventional metal horse 11. The units 10 are provided with rotor support devices 12. A rotor 13 extends between the units 10 and is rotatably supported on the devices 12. Drive means, schematically illustrated at 14, is provided for rotating the rotor 13 at selected velocities.

Upon rotation of the rotor 13, any unbalances will manifest themselves in vibratory movement of the rotor support devices 12 which are oscillatably supported by the units 10. The resulting oscillations of the rotor support devices 12 are measured by suitable electromechanical transducers 53 which are securely fastened to a swing structure (not visible) within the unit 10. The electromagnetic transducer 53 will translate cyclic mechanical movements of the rotor support device 12 into a sinusoidal electrical signal which is transmitted through electrical conductors 54 to input terminals of electrical wave analyzing apparatus 55 wherein the phase and amplitude of the translated electrical signal can be measured and related related to the physical constants of the rotor 13. Suitable electrical wave analyzing apparatus for dynamic balancing purposes has been disclosed in U.S. Pat. No. 2,711,647, assigned to the assignee of the present invention.

Referring to FIG. 2, the balancing support unit 10 comprises, in general, a housing 15, a swing structure 16, and a pedestal 17.

The swing structure 16 includes a mounting member 18 and a base member 19 suspended from the mounting member 18 by suspension means, such as a pair of pendulum arms 20. The base member 19 is free to swing about four parallel oscillation axes, indicated by the dash-dot lines 21, 22, 23 and 24.

The pedestal 17 is secured to the base member 19 and extends therefrom above the mounting member 18. A mounting plate 25 may be secured to the top of the pedestal 17 by fasteners 26. Alternatively, the mounting plate 25 may be pivotally connected to the pedestal 17 for oscillatory motion in a horizontal plane about a vertical axis and/or may be connected to the pedestal 17 by a threaded connection which permits vertical adjustments of the mounting plate 25 relative to the pedestal 17.

Referring to FIGS. 3 and 4, the housing 15 may comprise a rectangular tubular member 27 secured to a baseplate 28. The baseplate 28 may be provided with openings 57 facilitating securement of the support unit 10 to suitable support means. Support blocks 29 are secured to the opposite sides of the tubular member 27 at a selected distance above the baseplate 28.

The mounting member 18 of the swing structure 16, may comprise plates 30, 31 maintained in spaced, parallel relation by connecting blocks 32. The blocks 32 rest on the support blocks 29 and are secured thereto by plural fasteners 56.

The base member 19 may comprise plates 33, 34 maintained in spaced, parallel relation by end plates 35 connecting the opposite ends of the plates 33, 34.

The pendulum arms 20 have upper ends 36 disposed between and pivotally connected to the plates 30, 31 of the mounting member 18 by pivotal connections 38a; and lower ends 37 disposed between and pivotally connected to the plates 33, 34 of the base member 19 by pivotal connections 38b.

As best shown in FIG. 4, each of the pivotal connections 38a may comprise a pair of low friction oscillating bearings 39, 40, one connected to each of the plates 30, 31. A first pivot shaft 41a extends through the upper end 36 of the pendulum arm 20 and has its opposite ends connected to and freely pivotal in the bearings 39, 40. The pivotal connections 38b are similar to the pivotal connections 38a and include bearings 39, 40 and second pivot shafts 41b connecting the lower ends 37 to the bearings 39, 40.

The pedestal 17 may comprise a tubular member 42 having a generally rectangular configuration. The lower end of the tubular member 42 is positioned between the parallel plates 33, 34 and is rigidly secured thereto by any suitable means, such as tack welds 43. The tubular member 42 extends upwardly from the base member 19 between the parallel plates 30, 31 of the mounting member 18. The tubular member 42 terminates above the mounting member 18 and has a cap plate 44 secured to the upper end thereof. The cap plate 44 is provided with threaded openings 45 receiving the fasteners 26 which secure the mounting plate 25 to the pedestal 17.

It is a feature of the present balancing support unit 10 that, as best shown in FIG. 3, the entire swing structure 16 and the pedestal 17 are protectively enclosed within the housing 15. Thus, the movable components of the balancing support unit 10 are less subject to being damaged through misuse than those of prior art balancing stands.

In order to lock the swing structure 16 in a fixed position during the installation and removal of a rotor, locking means 46 is provided in association with the base member 19 as shown in FIGS. 3 and 4. The locking means 46 may comprise an eccentrically pivoted cam 47 connected to the end plate 35 and extending through an opening 48 in the housing 15. The cam 47 is provided with a circumferential groove 49 opposite the peripheral edge of the opening 48. In FIG. 3, the base member 19 is free to oscillate. In FIG. 4, the cam 47 has been rotated such that the circumferential groove 49 is frictionally engaged with periphery of the opening 48. The swing structure is locked in a fixed position.

As shown in FIG. 3, an extension member 51 is secured to the end plate 35 of the base member 19 and projects through a second opening 52 in the enclosure 35. The extension member 51 rigidly connects the transducer 53 to the swing structure 16.

If desired, each of the pivotal connection 38a, 38b may include a thrust bearing 58 positioned between and engaged with opposed faces of the upper mounting plates 30, 31 and the pendulum arms 20; and of the lower mounting plates 33, 34 and the pendulum arms 20, as illustrated in FIGS. 3 and 4.

We claim:

1. In a balancing support unit for use in dynamic balancing of rotors, said unit having a housing adapted to be secured to a support structure, and a swing structure adapted to support rotor support means, the improvement comprising:
    said swing structure being positioned entirely within said housing and including a base member, and suspension means for suspending said base member from said housing for free oscillatory motion within said housing; and
    a pedestal secured to said base member, extending therefrom upwardly beyond the top of said housing, and terminating in an upper platform adapted to receive said rotor support means.

2. The improvement of claim 1 wherein said suspension means includes:
    a rigid mounting member secured to said housing and extending parallel with said base member; and
    a pair of pendulum arms having upper ends pivotally connected to said mounting member and lower ends pivotally connected to said base member.

3. The improvement of claim 2 wherein said pedestal is positioned between said pendulum arms.

4. The improvement of claim 1 wherein said suspension means comprises:
    upper mounting members secured to said housing in spaced-apart generally parallel relation;
    a pivot shaft at the ends of each upper mounting member extending between said upper mounting members;
    a pair of pendulum arms, each of said arms being connected to a said first pivot shaft at its upper end; and
    means pivotally connecting the lower ends of said pendulum arms to said base member.

5. The improvement of claim 4 including a pair of thrust bearings carried by each said pivot shaft, one of said thrust bearings being positioned between and engaged with opposed faces of each of said upper mounting members and each said pendulum arm.

6. The improvement of claim 1 wherein said base member includes a pair of plate members maintained in spaced-apart, generally parallel relation; and wherein said suspension means comprises:
    a pair of upper mounting members secured to said housing in spaced-apart parallel relation, said mounting members being parallel with said plate members;
    a first pivot shaft at the ends of each upper mounting member extending between said upper mounting members;
    a second pivot shaft at the ends of each plate member extending between said plate members; and
    a pair of pendulum arms, each of said arms being connected to a said first pivot shaft at its upper end and to a said second pivot shaft at its lower end.

7. The improvement of claim 6 including a pair of thrust bearings carried by each said first pivot shaft and each said second pivot shaft, one of said thrust bearings being positioned between and engaged with opposed faces of each of said upper mounting members and each of said pendulum arms.